United States Patent Office 3,080,336
Patented Mar. 5, 1963

3,080,336
IMPROVED PROCESS FOR CURING FLUORO-
CARBON ELASTOMERS
John Frederick Smith, Brandywine Hundred, Del., assignor to E. I. du Pont de Nemours and Company, Wilmington, Del., a corporation of Delaware
No Drawing. Filed June 9, 1960, Ser. No. 34,898
5 Claims. (Cl. 260—41)

This invention relates to a curing process for fluorocarbon elastomers and more particularly to an improved process for curing fluorocarbon elastomers with hexamethylenediamine carbamate and certain tertiary amines.

Fluorocarbon elastomers are especially valuable because of their thermal stability and their good resistance to a wide variety of solvents, oils, fuels, and the like, particularly at high temperatures. Thus, they are being increasingly used in the manufacture of tubing employed as aircraft hose for carrying fuels and lubricants at high temperatures and pressures. Other valuable applications today include the preparation of molded O-ring seals for hydraulic systems and diaphragms for control apparatus.

It is known that satisfactory vulcanizates can be obtained by curing fluorocarbon elastomers with a combination of hexamethylenediamine carbamate and magnesium oxide. It would be desirable, however, to improve this process so as to increase the scorch resistance and to obtain a better cure.

It is an object of the present invention to provide an improved process for curing fluorocarbon elastomers. A further object is to provide a process for improving the effectiveness of hexamethylenediamine carbamate and magnesium oxide in curing fluorocarbon elastomers. A still further object is to provide an improved cured fluorocarbon elastomer obtained by a process which permits of a high degree of processing safety. Other objects will appear hereinafter.

These and other objects of this invention are accomplished by a process for curing a fluorocarbon elastomer which comprises incorporating therewith, per 100 parts by weight of said elastomer, (a) from about 0.5 to 3.0 parts by weight of hexamethylenediamine carbamate and (b) from about 5.0 to 20.0 parts by weight of magnesium oxide, followed by the step of heating the mixture thereby obtained at 100° to 205° C. so as to effect a cure, with the proviso that from about 0.1 part to 2.0 parts by weight of a tertiary amine having at least one amino group which has a pKb value less than 4.5 at 25° C. be incorporated into said elastomer prior to heating, said tertiary amine being selected from the group consisting of tertiary alkylamines, tertiary cycloalkylamines, N-alkyl piperidines, N,N-dialkyl piperazines and N,N,N',N'-tetraalkylalkylenediamines. The present invention is based on the discovery that when a tertiary amine of the type specified above is added to a curing recipe for fluorocarbon elastomers containing hexamethylenediamine carbamate and magnesium oxide, the amount of hexamethylenediamine carbamate required to attain a particular state of cure can be reduced. At the same time, the Mooney scorch time of the stock is significantly increased. The use of the present invention thus permits attainment of a satisfactory state of cure with a high degree of processing safety.

The fluorocarbon elastomers which may be cured according to the process of the present invention include (a) a vinylidene fluoride-hexafluoropropene copolymer containing from 30 to 70 percent by weight of vinylidene fluoride and from 70 to 30 percent by weight of hexafluoropropene and (b) a copolymer of vinylidene fluoride, hexafluoropropene and tetrafluoroethylene containing from 3 to 35 percent by weight of tetrafluoroethylene units, the balance being vinylidene fluoride and hexafluoropropene units, with the weight ratio of vinylidene flouride units to hexafluoropropene units having a value ranging from 2.33:1 to 0.667:1.

In order that the copolymers of vinylidene fluoride and hexafluoropropene be elastomeric, it is necessary that they contain from about 30 to about 70 percent by weight of vinylidene fluoride units with a preferred elastomeric copolymer containing between about 53 and 70 percent by weight of vinylidene fluoride units. The copolymers of vinylidene fluoride and hexafluoropropene are described in "Industrial and Engineering Chemistry," vol. 49, p. 1687 (1957), French Patent 1,153,164, Italian Patent 553,285 and British patent specification 789,786.

The other elastomeric copolymers, which may be used, contain from 3 to 35 percent by weight of tetrafluoroethylene units, the balance being vinylidene fluoride and hexafluoropropene units, with the weight ratio of vinylidene fluoride units to hexafluoropropene units having a value ranging from 2.33:1 to 0.667:1. The weight ratio of vinylidene fluoride units to hexafluoropropene units corresponds to a range of 70 to 40 percent by weight of vinylidene fluoride and 30 to 60 percent by weight of hexafluoropropene monomer units. When the proportions of vinylidene fluoride units and hexafluoropropene units are within this ratio, the copolymer is elastomeric. When the proportion of hexafluoropropene units to vinylidene fluoride units drops below about 30 percent the products are plastic rather than elastic. On the other hand, about 60 percent is the largest proportion of hexafluoropropene units which yields a satisfactory elastic copolymer. In the same vein, the content of tetrafluoroethylene units should not exceed about 35 percent by weight of the total copolymer if the elastomeric properties of the copolymer are to be retained. A preferred range of composition for the copolymers used in the present invention consists of 15 to 25 percent by weight of tetrafluoroethylene units and 85 to 75 percent by weight of vinylidene fluoride and hexafluoropropene units, the vinylidene fluoride and hexafluoropropene units being present in a weight ratio within the range of 2.33:1.0 to 0.667:1.0. These copolymers are made by copolymerization of a mixture of the monomers using well known polymerization conditions. Preferably the familiar aqueous redox polymerization system is used. Polymerization may be initiated by the use of the ammonium persulfate-sodium bisulfite system. Polymerization is normally accomplished under pressure at moderately elevated temperatures.

The process of this invention is carried out by compounding every 100 parts by weight of the fluorocarbon elastomer with 0.5 part to 3.0 parts by weight of hexamethylenediamine carbamate, 5.0 to 20.0 parts by weight of magnesium oxide, and 0.1 part to 2.0 parts by weight of a tertiary amine. When less than the minimum concentrations of the hexamethylenediamine carbamate and the magnesium oxide are used, the culcanizate obtained is undercured. A brittle overcured product results when more than 3.0 parts of the hexamethylenediamine carbamate is employed. Excess magnesium oxide leads to a stiff stock. When the tertiary amine concentration is less than about 0.1 part, the improvement obtained is too slight to be entirely satisfactory. It is unnecessary to use more than about 2.0 parts.

The tertiary amines used in the present invention are selected from the group consisting of tertiary alkylamines, tertiary cycloalkylamines, N-alkyl piperidines, N,N'-dialkyl piperazines, and N,N,N',N'-tetraalkylalkylenediamines. Mixtures of these amines may be used. To be useful in the present invention the tertiary amine should be sufficiently basic so that at least one of the amine groups has a pKb value at 25° C. or less than 4.50. The preferred tertiary alkylamines contain up to about 22 carbon atoms; the preferred tertiary cycloalkylamines contain up to about 30 carbon atoms; the preferred N-alkyl piperidines contain up to about 5 carbon atoms in the alkyl group; the preferred N,N'-dialkyl piperazines contain up to about 5 carbon atoms in the alkyl groups and the preferred N,N,N',N'-tetraalkylalkylenediamines contain up to about 30 carbon atoms. The tertiary alkylamines are preferred, more particularly the di-lower alkyl-higher alkylamines such as dimethyldodecylamine, dimethyltetradecylamine, diethylhexadecylamine, and methylethyloctadecylamine. Other representative compounds which may be used include trimethylamine, diethylmethylamine, tri-n-propylamine, tri-n-butylamine, tri-n-amylamine, diethylisopropylamine, dimethyl-n-butylamine, dimethylcyclohexylamine, N-methylpiperidine, N-ethylpiperidine, N-propylpiperidine, N-isopropylpiperidine, N-butylpiperidine, N-isobutylpiperidine, N-isoamylpiperidine, N-methyl-3-isopropylpiperidine, 2-methyl-N,3-diethylpiperidine, N,N'-dimethylpiperazine, N,N'-diethylpiperazine, N,N'-dipropylpiperazine, N,N'-diisoamylpiperazine, N,N,N',N'-tetramethyltrimethylenediamine, N,N,N',N'-tetraethyltrimethylenediamine, N,N,N',N'-tetramethyltetraethylenediamine, and N,N,N',N'-tetramethylhexamethylenediamine. The tertiary amines can be incorporated with the fluorocarbon elastomer in the form of their acid salts such as the hydrochloride salt. This alternative is preferred in the case of the more volatile tertiary amines such as trimethylamine.

Fillers and reinforcing agents, such as carbon blacks and the known wide variety of mineral fillers, may be employed in varying quantities such as from 10 to 60 parts by weight, depending upon the degree of hardness, heat resistance and stability in general desired in the cured product. The carbon blacks may be those normally used in elastomers, such as thermal, furnace and channel blacks. Mineral fillers including the fine silicas, clays and diatomaceous earth, may be used. Alkaline fillers such as alkaline carbon blacks and silicas are preferred. Pigments may be incorporated for color effects.

The curing agents of this invention, i.e. hexamethylenediamine carbamate, magnesium oxide and tertiary amine, and the optional additives are incorporated into the fluorocarbon elastomer by conventional methods such as by milling in heavy-duty mixers or the usual rubber milling equipment. The addition may be in any order desired, although it is preferred to add the carbamate last. Ordinarily water-cooled milling equipment will be used so that curing or cross-linking temperatures are not reached.

After the fluorocarbon elastomer has been completely compounded, the stock obtained is cured by heating. In general, temperatures between about 100° C. and 205° C. are used. In order to reach as complete a state of cure as possible, it is recommended that at least the final portion of the curing cycle be carried out in an open oven at about 200 to 205° C. Thin films (e.g. 0.1 inch in thickness) or small articles from which water vapor and other gaseous by-products of the cure can escape can be vulcanized directly this way. However, larger articles of thicker cross-section need a preliminary curing cycle under compression in a mold to develop sufficient cross-links within them to prevent rupture and sponging from occurring when they are heated in an open oven. Accordingly, the cure is quite frequently carried out in two stages: the first, a press cure of about 5 to 60 minutes at 100–150° C.; the second, a subsequent oven cure at about 200–205° C. for at least 10 hours. The articles are held in the press for as long a time as is necessary to develop sufficient cross-links to prevent rupture and sponging on subsequent heating in an open oven. The time required for this operation will depend upon the size and thickness of the article involved. Those skilled in the art can readily determine the optimum conditions for a particular article. In general, it is preferred to press cure at 150° C. for 5 to 60 minutes. For the oven cycle 18 to 20 hours is preferred. When a period shorter than 18 hours is employed, the compression set of the vulcanizate leaves something to be desired and aftercuring during high temperature-use may occur. Extension of oven curing beyond 20 hours is unnecessary and uneconomical.

The following example will better illustrate the nature of the present invention; however, the invention is not intended to be limited to this example. Parts are by weight unless otherwise indicated.

The tests in the following example were conducted in accordance with the following methods:

| Test— | ASTM test method |
|---|---|
| Mooney scorch | D 1077–55T. |
| Modulus at 100% extension | D412–51T. |
| Compression set | D 395–55 (Method B). |

Fluorocarbon elastomer A is a 60/40 weight percent copolymer of vinylidene fluoride and hexafluoropropene. It has an inherent viscosity (0.1 gram copolymer in 100 cc. of an 87/13 weight percent tetrahydrofuran/dimethyl formamide mixture at 30° C.) of 0.95 ± 0.05, a Mooney viscosity (ML 10 at 100° C.) of 75 ± 6 and a number average molecular weight of about 100,000. The general procedure for preparation of polymers of this type is given in "Industrial and Engineering Chemistry," 49, 1687 (1957).

EXAMPLE 1

Five stocks (1A–1E) were compounded on a rubber roll mill at 25° C. Table I below gives the recipe and the Mooney scorch data for each stock. After these stocks had been heated in a press at 150° C. for one hour, they were removed and heated in a circulating air oven at 204° C. for 18 hours. Table I below gives the vulcanizate data obtained.

*Table I*

|  | Stocks | | | | |
|---|---|---|---|---|---|
|  | 1A | 1B | 1C | 1D | 1E |
| Component: | | | | | |
| Fluorocarbon Elastomer A | 100 | 100 | 100 | 100 | 100 |
| Medium Thermal Black | 18 | 18 | 18 | 18 | 18 |
| Magnesium Oxide | 15 | 15 | 15 | 15 | 15 |
| Hexamethylenediamine Carbamate | 1 | 1 | 0.5 | 0.25 | 0 |
| Dimethyldodecylamine | 0 | 0.1 | 0.25 | 0.5 | 1.0 |
| Property: | | | | | |
| Mooney Scorch (min. to 20 pt. rise) | 13 | 19 | 20 | 25 | >45 |
| Modulus at 100% Extension at 25° C. (p.s.i.) | 430 | 650 | 400 | 330 | sponged |
| Compression Set, 22 hrs., at 70° C. (percent) | 31 | 16 | 24 | 27 | sponged |

The following typical observations taken from the above example illustrate the improvement provided by the present invention. When one part of hexamethylenediamine carbamate was compounded with a vinylidene fluoride/hexafluoropropene copolymer stock containing magnesium oxide and carbon black, the time taken for a 20 point rise in the Mooney scorch test was 13 minutes; the vulcanizate obtained had a modulus at 100 percent extension of 430 p.s.i. and a compression set of 31 percent. When one part of dimethyldodecylamine, a representative tertiary amine, was used in place of the hexamethylenediamine carbamate, an undercured sponged vulcanizate resulted under the same curing conditions. When, however, 0.5 part of hexamethylenediamine carbamate was used as a curing system in combination with 0.25 part of dimethyldodecylamine, the Mooney scorch was greatly improved (20 minutes to a 20 point rise), the modulus at 100 percent extension of the vulcanizate was 400 p.s.i., and the compression set was 24. The state of cure thus obtained was at least equivalent to that of the conventional stock containing twice as much hexamethylenediamine carbamate. At the same time the processing safety was much enhanced. It is highly surprising that the above-specified tertiary amines can be substituted for part of the hexamethylenediamine carbamate and that the combinations display a synergistic action.

As many widely different embodiments of this invention may be made without departing from the spirit and scope thereof, it is to be understood that this invention is not limited to the specific embodiments thereof except as defined in the appended claims.

What is claimed is:

1. In the process of curing a fluorocarbon elastomer selected from the group consisting of a vinylidene fluoride-hexafluoropropene copolymer containing from about 30 to 70 percent by weight of vinylidene fluoride and from about 70 to 30 percent by weight of hexafluoropropene and a vinylidene fluoride-hexafluoropropene-tetrafluoroethylene copolymer containing from about 3 to 35 percent by weight of tetrafluoroethylene units, the balance being vinylidene fluoride and hexafluoropropene units with the weight ratio of vinylidene fluoride units to hexafluoropropene units having a value ranging from 2.33:1 to 0.667:1 which comprises incorporating therewith per 100 parts by weight of said fluorocarbon elastomer (a) from about 0.5 to 3.0 parts by weight of hexamethylenediamine carbamate and (b) from about 5.0 to 20.0 parts by weight of magnesium oxide followed by the step of heating the mixture thereby obtained at 100 to 205° C. so as to effect a cure, the improvement comprising incorporating into said fluorocarbon elastomer prior to heating from about 0.1 to 2.0 parts by weight of a tertiary amine having at least one amino group which has a pKb value at 25° C. less than 4.5, said tertiary amine being selected from the group consisting of tertiary alkylamines, tertiary cycloalkylamines, N-alkyl piperidines, N,N'-dialkyl piperazines and N,N,N',N'-tetraalkylalkylenediamines.

2. A process according to claim 1 wherein the fluorocarbon elastomer is a vinylidene fluoride-hexafluoropropene copolymer containing from about 30 to 70 percent by weight of vinylidene fluoride and from about 70 to 30 percent by weight of hexafluoropropene.

3. A process according to claim 1 wherein the fluorocarbon elastomer is a copolymer of vinylidene fluoride, hexafluoropropene and tetrafluoroethylene containing from about 3 to 35 percent by weight of tetrafluoroethylene units, the balance being vinylidene fluoride and hexafluoropropene units with the weight ratio of vinylidene fluoride units to hexafluoropropene units having a value ranging from 2.33:1 to 0.677:1.

4. A process according to claim 2 wherein the fluorocarbon elastomer is mixed with 0.5 part of hexamethylenediamine carbamate, 15 parts of magnesium oxide and from 0.1 to 0.25 part of dimethyldodecylamine.

5. A process according to claim 3 wherein the fluorocarbon elastomer is mixed with 0.5 part of hexamethylenediamine carbamate, 15 parts of magnesium oxide and from 0.1 to 0.25 part of dimethyldodecylamine.

References Cited in the file of this patent

UNITED STATES PATENTS

| 2,933,481 | Rugg | Apr. 19, 1960 |
| 2,951,832 | Moran | Sept. 6, 1960 |

OTHER REFERENCES

Moran et al.: "Safe Processing Curing Systems for Viton Fluoroelastomers," Ind. and Eng. Research, vol. 51, No. 7, July 1959.